United States Patent [19]

Todd

[11] Patent Number: 5,607,065

[45] Date of Patent: *Mar. 4, 1997

[54] SHELVING STORAGE UNIT

[76] Inventor: Michael L. Todd, 16360 Evans Ave., South Holland, Ill. 60473

[ * ] Notice: The term of this patent shall not extend beyond the expiration date of Pat. No. Des. 361,463.

[21] Appl. No.: 368,621

[22] Filed: Jan. 4, 1995

[51] Int. Cl.$^6$ .................................................. A47G 29/00
[52] U.S. Cl. .............................. 211/40; 211/41; 211/163; D6/407; D6/629; D6/630
[58] Field of Search .................................. 211/40, 41, 163; 312/9.45, 9.46, 9.48; D6/407, 626, 627, 628, 629, 630

[56] References Cited

U.S. PATENT DOCUMENTS

| D. 352,187 | 11/1994 | David | D6/407 |
|---|---|---|---|
| D. 360,097 | 7/1995 | Chu | D6/407 X |
| D. 365,243 | 12/1995 | Kwa | D6/629 |
| D. 366,868 | 2/1996 | Ohsawa | D6/629 X |
| 1,419,487 | 6/1922 | Blocker | 312/9.46 |
| 5,031,779 | 7/1991 | Szenat et al. | 211/163 X |
| 5,301,819 | 4/1994 | Moeken | 211/40 |
| 5,358,124 | 10/1994 | Mueller | 211/41 |

Primary Examiner—Ramon O. Ramirez
Assistant Examiner—Michael J. Turgeon
Attorney, Agent, or Firm—Potthast & Ring

[57] ABSTRACT

A shelving storage unit (10) for supporting at least one of recorded-media and boxes (12) or the like containing recorded-media having a width (W) of greater dimension than thickness (T) of opposing side edges (14) and opposing ends (16) having an axis (18) extending through opposing side edges (14) which includes base (20) and frame member (22) supported by and extending upwardly from base (20) in which first support assembly (24) is secured to frame member (22) adapted for supporting first box (26) and second support assembly (28) secured to frame member (22) adapted to support second box (30), in which first and second support assemblies (24,28) are positioned at substantially the same elevation above base (20), to align opposing side edges (14) of first box (26) in substantial parallel relationship to opposing side edges (14) of second box (30) and to align at least a portion of end (16) of first box (26) with end (16) of second box (30) and member (32) supported by base (20) and interposed and spaced apart from first and second support assemblies (24,28) in which first and second support assemblies (24,28) are adapted to support portion (34) of first and second boxes (26,30) and permit another portion (36) of first and second boxes (26,30) to extend beyond first and second support assemblies (24,28) in a direction toward member (32) and in which member (32) is positioned to abut ends (16) of first and second boxes (26,30) and maintain ends (16) of first and second boxes (26,30) in a spaced apart relationship. Also, adjacent support assembly (38) secured to frame member (22) adjacent to first support assembly (24) and at a different elevation along frame member (22) above base (20) than first support assembly (24), in which adjacent support assembly (38) is adapted for supporting another box (40) in which adjacent support assembly (38) is positioned transverse to first support assembly (24) and position another box (40) in transverse relationship to first box (26) and member (32) supported by base (20) and interposed and spaced apart from first and adjacent support assemblies (24,38) in which first and adjacent support assemblies (24,38) are adapted to support a portion (34) of first and another box (26,40) and permit another portion (36) of first and another box (26,40) to extend beyond first and adjacent assemblies (24,38) respectively in a direction toward member (32) and in which member (32) provides an abutment for any first and another box (26,40) supported by first and adjacent support assemblies (24,38) in which member (32) is positioned to permit a portion of first box (26) and another box (40) to overlie one another.

34 Claims, 4 Drawing Sheets

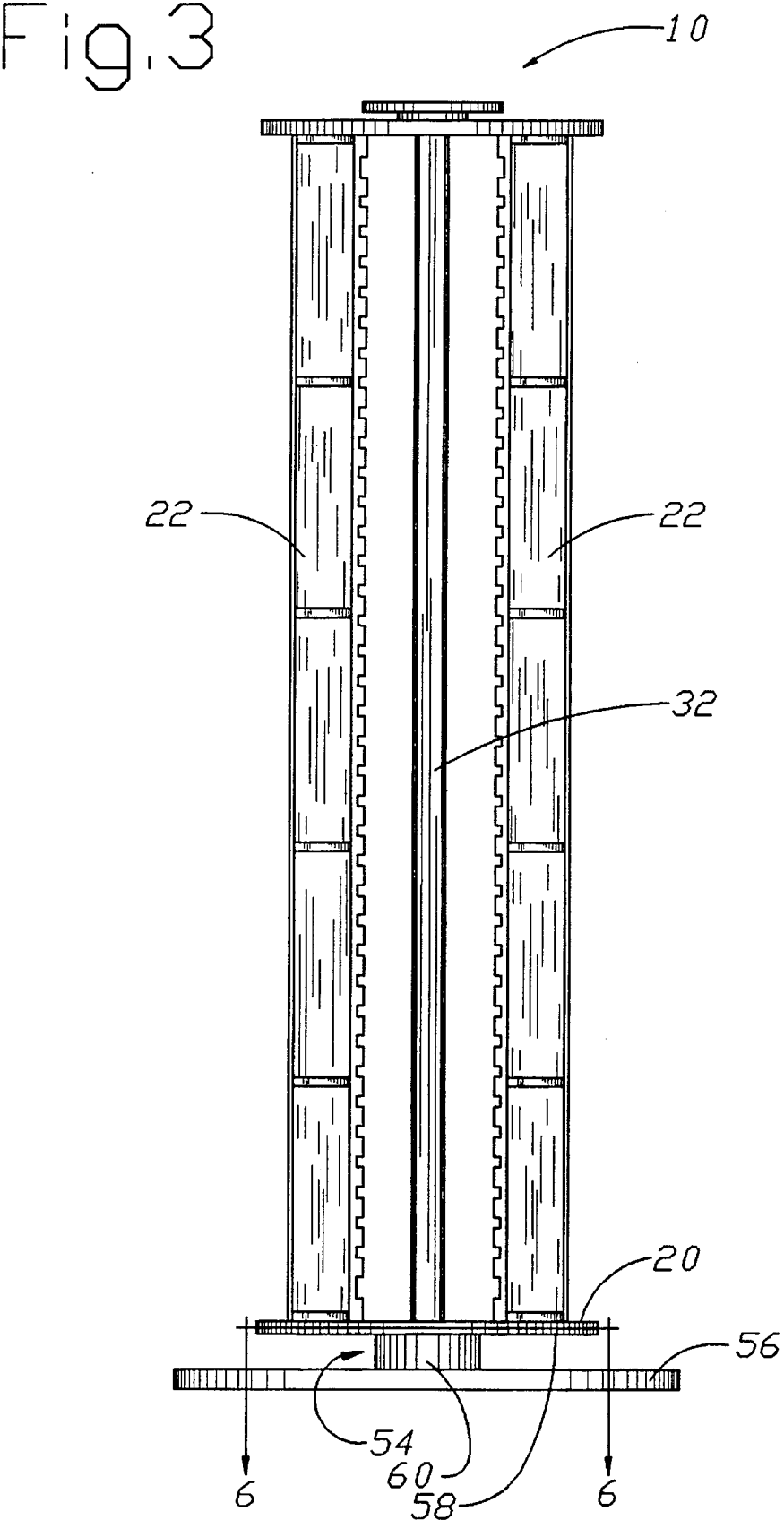

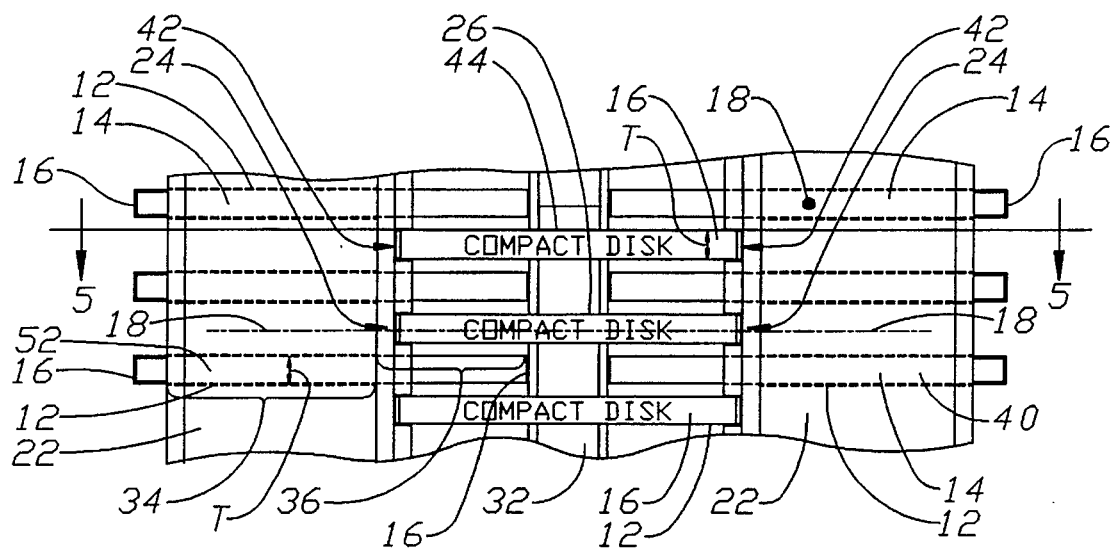
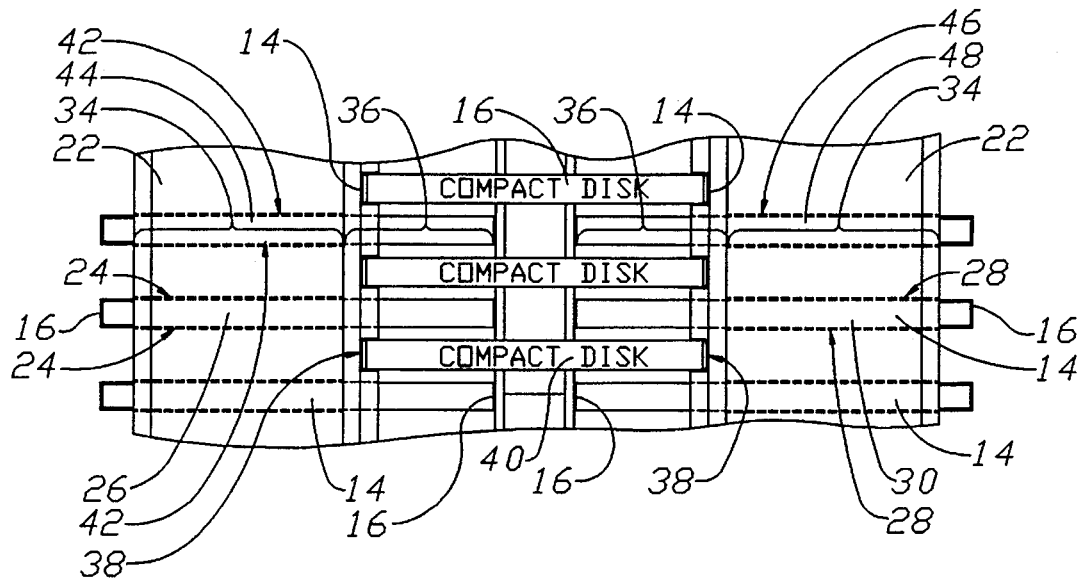

SHELVING STORAGE UNIT

BACKGROUND OF THE INVENTION

1. Field of the Invention

The present invention relates to shelving storage unit and more particularly to a shelving storage unit for supporting recorded-media boxes containing compact discs, video tapes and other audio and or visual recorded devices and for the units carrying these items without a box.

2. Description of the Related Art Including Information Disclosed Under 37 CFR 1.97–1.99

There are numerous shelving storage units for supporting recorded-media boxes or even the media itself without the boxes. With the advent of home media entertainment and the expansion of the industry, consumers accumulate more recorded-media and as a result there has been a continuing° need to store the boxes containing the recorded-media and similarly the recorded-media without a box for easy access and provide compact storage arrangements.

With regard to well known recorded-media storage units such as U.S. Pat. No. Des. 279,045 issued to Hall, U.S. Pat. No. Des. 333,225 issued to Robinson, U.S. Pat. Des. 292,644 issued to Hall et al., U.S. Pat. No. 5,188,240 issued to Marino et al., U.S. Pat. No. 2,581,547 issued to F. K. Martini, U.S. Pat. No. 1,419,487 issued to A. G. Blocker, U.S. Pat. No. 4,802,587 issued to Armijo et al., U.S. Pat. No. 5,031,779 issued to Szenay et al. and U.S. Pat. No. 5,176,264 issued to De Palma, it appears storage units that have multiple support assemblies for supporting recorded-media or boxes containing the recorded-media are provided.

However, none of these storage units appear to have two support assemblies at substantially the same elevation adapted to each support opposing side edges of a box containing the recorded-media or the recorded-media itself, in which the opposing side edges of the boxes or recorded-media itself align to each other and a portion of each are supported by the assemblies and another portion of the same extends beyond their respective support assembly in the direction of a member interposed and spaced apart from two opposing support assemblies to abut the ends of the boxes and/or recorded-media and keep them spaced apart. This configuration does not require the box to be supported with the assembly along its entirety and permits a portion of the box which extends beyond its respective support assembly to be in a centralized compact protective position in abutment with the spaced apart and interposed common member.

Furthermore, none of these storage units appear to provide two support assemblies at differing elevations and transverse to one another positioning the boxes supported by the respective assemblies in transverse relationship to one another in which the assemblies support a portion of each box and another portion extends beyond the respective support assembly in a direction toward a member to abut the member to permit portions of the boxes that extend beyond their respective transverse support assemblies to overlie one another. This configuration again does not require the box to be supported with the assembly along its entirety and permits a portion of the box which extends beyond its respective support assembly to be in a desired centralized protective position in abutment with the spaced apart and interposed common member and providing even more compactness with portions of the boxes overlapping.

SUMMARY OF INVENTION

It is therefore the principal object of the present invention is to provide a storage unit which will provide compact storage of the boxes containing recorded-media or even the recorded-media itself and provide easy access to the same.

It is another object of the present invention to provide a simple efficient construction of a storage unit.

Another object of this invention is to provide a shelving storage unit for supporting at least one of recorded-media and boxes containing recorded-media having a width of greater dimension than the thickness of the opposing side edges and opposing ends having an axis extending through opposing side edges which has a base and a frame member supported by and extending upwardly from the base. A first support assembly is secured to the frame member adapted for supporting a first box and a second support assembly is secured to the frame member adapted to support a second box. The first and second support assemblies are positioned at substantially the same elevation above the base, to align opposing side edges of the first box in substantial parallel relationship to opposing side edges of the second box and to align at least a portion of an end of the first box with an end of the second box. Provided additionally is a member supported by the base and interposed and spaced apart from the first and second support assemblies in which the first and second support assemblies are adapted to support a portion of the first and second boxes and permit another portion of the first and second boxes to extend beyond the first and second support assemblies in a direction toward the member. The member is positioned to abut the ends of the first and second box members and maintain the ends of the first and second box members in a spaced apart relationship.

Yet another object of this invention is to provide a shelving storage unit having a base with a frame member supported by and likewise extending upwardly from said base and supported by said base. A first support assembly is secured to the frame member and adapted for supporting a first box and an adjacent support assembly is secured to the frame member adjacent to the first support assembly and at a different elevation along the frame member above the base than the first support assembly. The adjacent support assembly is adapted for supporting another box in which the adjacent support assembly is positioned transverse to the first support assembly and position the another box in transverse relationship to the first box. A member supported by the base and interposed and spaced apart from the first and adjacent support assemblies in which first and adjacent support assemblies are adapted to support a portion of the first and another box and permit another portion of the first and another box to extend beyond the first and adjacent assemblies respectively in a direction toward the member. The member provides an abutment for any of the first and another box supported by the first and adjacent support assemblies in which the member is positioned to permit at least a portion of the first box and the another box to overlie one another.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 3 is a front elevational view of the shelving storage unit;

FIG. 4A is an enlarged view of support assemblies of the shelving storage unit supporting boxes;

FIG. 4B is an enlarged view of support assemblies of the shelving storage unit generally as shown in FIG. 4A rotated 90 degrees;

DESCRIPTION OF THE PREFERRED EMBODIMENT

Figure 1:
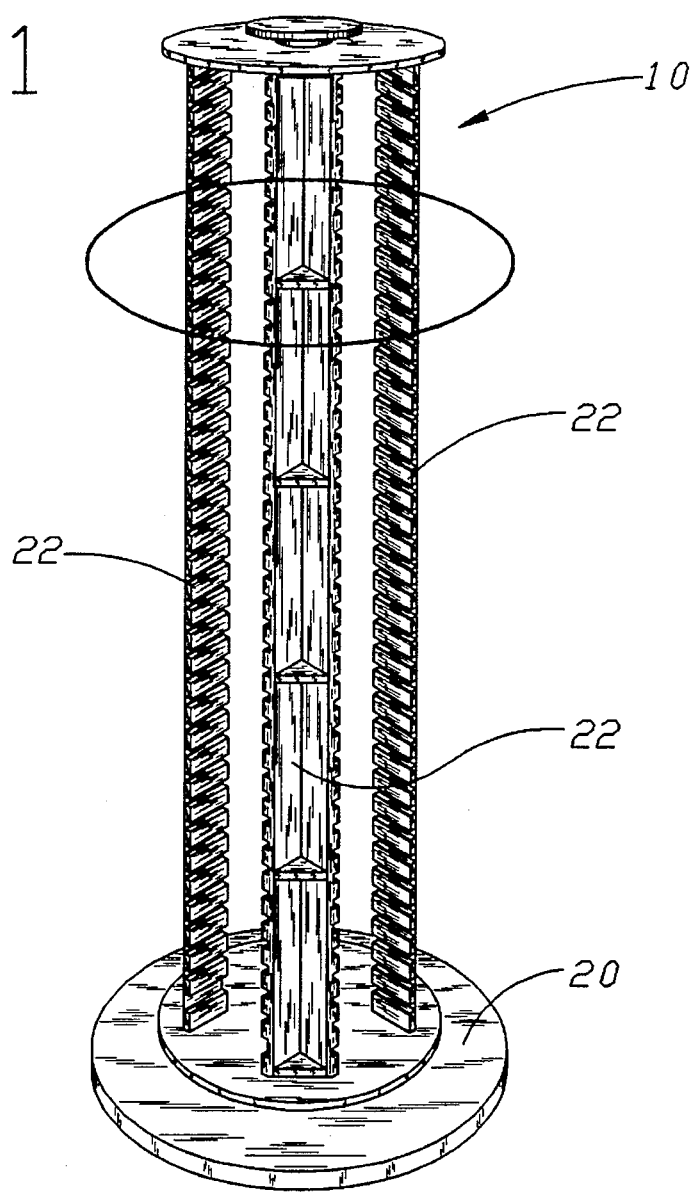
FIG. 1 is a perspective view of the shelving storage unit.

Referring now to the drawings shelving storage unit 10 is shown in FIG. 1. It is used to store boxes that contain recorded-media and/or the recorded-media itself if appropriate. Typical recorded-media include compact disks, VHS tapes and the like. Shelving storage unit 10 is typically constructed of wood, however, metal, plastic and veneers, as well as, many other common materials are used.

For purposes of describing this particular unit as shown, boxes 12 that contain recorded-media such as a compact disk will be used. Boxes 12 for this purpose, as shown in FIGS. 2, 4A, 4B, and 5, have width (W) that is of a greater dimension than thickness (T) of opposing side edges 14 and opposing ends 16. Additionally, since the boxes used typically have symmetry, boxes 12 have axis 18 which, as seen in FIG. 4A, extends through opposing side edges 14.

Shelving storage unit 10 has base 20 for supporting it upon typically a flat surface such as a floor. Frame member 22, as seen in FIGS. 1–4, is supported by base 20 and extends upwardly from base 20 typically in a substantially vertical direction from base 20.

First support assembly 24, as shown in FIGS. 2, 4A, 4B and 5, is utilized to support first box 12. First support assembly 24 can be of many different structures such as a shelf, or as shown in FIGS. 2–4A, a pair of spaced apart support members such as grooves disposed in frame member 22 that engage opposing side edges 14 of first box 26. In conjunction with first support assembly 24, second support assembly 28 likewise can be made of many different structures, however it is shown as spaced apart support members or grooves disposed in frame member 22 that engage opposing side edges 14 of second box 30.

As can be seen in FIGS. 2, 3, 4A and 4B, first and second support assemblies 24 and 28 are positioned at substantially the same elevation above base 20. It is further shown that first and second support assemblies 24, 28 are positioned to align opposing side edges 14 of first and second boxes 26,30 in substantial parallel relationship so that ends 16 of first and second boxes that are most proximate to one another have at least a portion of each align with one another. In these figures first and second support assemblies 24,28 are aligned with one another whereby boxes 26 and 30 are also aligned with one another.

Pairs of grooves of first and second support assemblies 24, 28 respectively are disposed in frame member 22 are spaced apart from one another and are substantially aligned longitudinally and desirably substantially parallel to one another which result in first and second boxes 26,30 being aligned. As can be seen in these drawings, the grooves are longer than they are wide and it is desirable for the width to be close to the thickness T of boxes 12 for compactness but not too narrow to make it difficult to slide box 12 in and out of the shelving unit.

Member 32, as seen in FIGS. 3, 4A, 4B and 5, is supported by base 20 and extends upwardly from base 20. Member 32 as shown is a pole but could take on numerous other configurations to successfully carry out the invention. Member 32 is interposed and spaced apart from first and second support assemblies 24,28. First and second support assemblies 24,28 are adapted, and as shown, only extend a distance to support a portion 34 of first and second boxes 26,30. Another portion 36 of first and second boxes, as a result, is permitted to extend beyond first and second support assemblies 24,28, out of contact with the same, in a direction toward member 32. Member or pole 32 is positioned to abut ends 16 of first and second boxes and maintain ends 16 of these opposing boxes in a spaced apart relationship.

It is preferred to keep boxes 12 stored in substantially horizontal position. However, it is contemplated that it may be at times desirable to store boxes 12 in somewhat of a tilted position. The tilted position would include maintaining axis 18, as shown in FIG. 4A, in a substantially horizontal position. In that instance, this would mean boxes 12 would be still stored relatively flat wise in the shelving unit however, the portion of boxes 12 stored closer to member 32 may be at a higher or lower elevation than the portion of box 12 that is closest to the outer portion of frame member 22.

Figure 2:
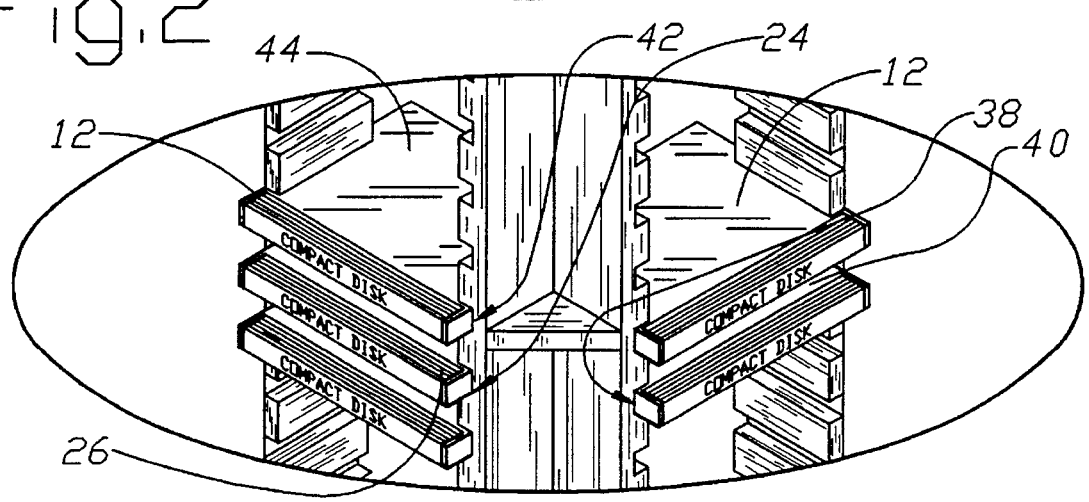
FIG. 2 is an enlarged view of that which is encircled in FIG. 1.

It is desirable to stack additional support assemblies above and below first and second support assemblies 24,28 as generally seen in FIGS. 1 and 3. In addressing this stacking structure an example of yet another support assembly 42 as seen in FIGS. 2 and A is secured to frame member 22 and spaced apart vertically above and along frame member 22 from first support assembly 24. As can be seen, yet another support assembly 42 is substantially in vertical alignment with first support assembly 24. As a result, box 44 supported by yet another support assembly 42 is stacked over first box 26. This stacking arrangement provides ease in access, desirable compactness, organization of the boxes and overall appearance of storage.

Similarly, member 32 is positioned spaced apart from yet another support assembly 42 and in which support assembly 42 is adapted to support a portion 34 of yet another box 44, as seen in FIG. 4B, and permit another portion 36 of box 44 to extend beyond support assembly 42 in a direction toward member 32. Member 32 is positioned to abut end 16 of yet another box 44.

Likewise, support assembly 42 is structured as support assemblies 24,28. Their structure may vary, however, a desirable construction is pair of spaced apart support members or pair of grooves. The grooves are substantially parallel to one another and engage opposing side edges 14 of box 44 and as mentioned earlier pair of grooves of support assembly 42 are in vertical alignment with first support assembly 24 grooves. This construction provides alignment of boxes in a stack arrangement.

Figure 5:
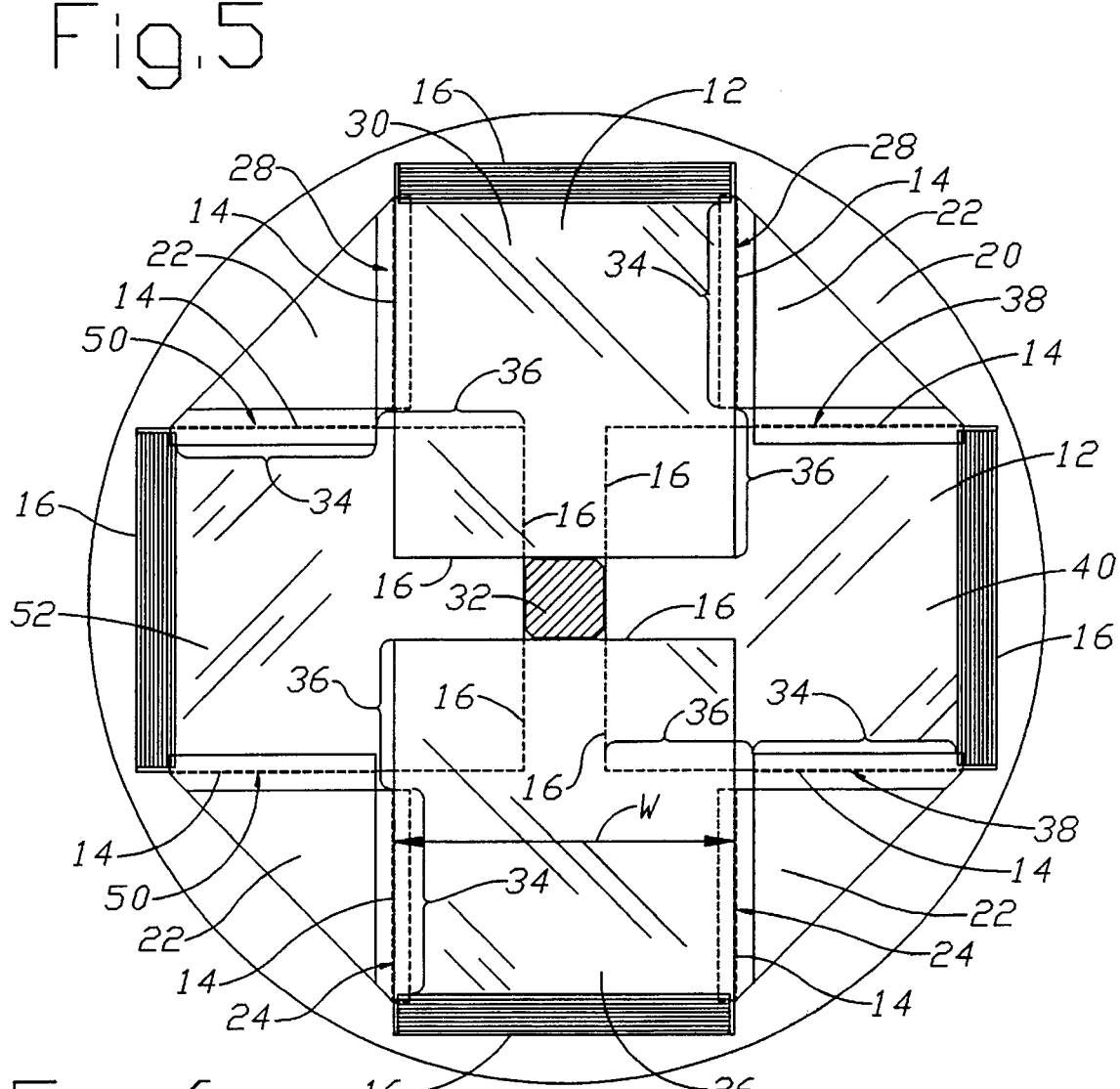
FIG. 5 is a cross section view as seen along line 5—5 of FIG. 4A.

The stacking of boxes 12 is further accomplished with providing a stacking vertical alignment of support assemblies above and below second support assembly 28. An example of this construction provides further support assembly 46 that is adapted to support further box 48 which is shown in FIG. 4B. Support assembly 46 is secured to frame member 22 and is spaced apart vertically from second support assembly 28. As previously discussed support assembly 46 can take on numerous constructions however a desirable construction includes a pair of spaced apart support members or pair of grooves. Further support assembly 46 is in similar relationship to yet another support assembly 42 as first and second support assemblies 24,28 are shown in FIG. 5. Further support assembly 46 includes a pair of grooves substantially parallel to one another and are adapted to support a portion 34 of opposing side edges 14 of further box 48. It is desirable to support box 48 in generally horizontal position however, it is contemplated to orient the grooves to accommodate tilting box 48 as was discussed earlier. The grooves of support assembly 46 substantially parallel to one another and substantially align with the grooves of yet another support assembly 42. Further, member 32 is interposed and spaced apart from support assemblies 42 and 46 which maintains ends 16 of boxes 44 and 48 spaced apart.

As a result of this construction corresponding stacks of support assemblies that are in alignment are provided on either side of member 32 in which a portion 34 of boxes 12 are supported by the support assemblies and another portion 36 extends beyond the support assemblies and abuts member 32.

A further aspect of this invention is to have support assemblies such as third or adjacent support assembly 38 secured to frame member 22 at a different elevation above base 20 than first support assembly 24 or rather vertically spaced from first support assembly 24. As a result, third or adjacent support assembly 38 is likewise vertically spaced from second support assembly 28. Third or adjacent support assembly 38 is adjacent to first support assembly 24 and is positioned transverse to the same and therefore is adapted to support third or another box 40 transverse to first box 26. Based on earlier discussion, likewise third or adjacent support assembly 38 will be positioned transverse to second support assembly 28 thereby positioning third and second boxes 40,30 in transverse relationship to one another. As is shown, these transverse relationships are preferably substantially perpendicular to one another.

Third or adjacent support assembly 38 is also spaced apart from member 32. Member 32 as discussed above is supported by base 20 and interposed and spaced apart from first, second and third or adjacent support assemblies in which support assembly 38 also is adapted to support portion 34 of third box 40 and another portion 36 extends beyond third support assembly 38 in a direction toward member 32. Member 32 is positioned to abut end 16 of third or another box 40 and permit at least a portion of said third box 40, as seen in FIG. 5, and a portion of at least one of first and second boxes 26,30 to overlie one another. This overlying or overlapping provides boxes 12 to be arranged in a very desirable compact configuration.

Once again, third or adjacent support assembly 38 like first and second support assemblies 24,28 contemplates numerous construction configurations however it is preferable to have the construction be spaced apart support members or pair of grooves. Third or adjacent support assembly 38 is a pair of grooves which support a portion 34 of opposing edges 14 of third or another box 40 and preferably these grooves much like the other grooves discussed above and for all of the grooves disposed in storage unit 10 desirably support box 40 so that the axis that runs through opposing side edges 14 of box 40 is maintained in generally horizontal position.

Fourth support assembly 50 is secured to frame member 22 as well. Fourth support assembly 50 is adapted to support box 52 in which third and fourth support assemblies 38,50 are at substantially the same elevation. Once again, fourth support assembly 50 is preferably constructed of a pair of spaced apart support members or grooves. Fourth support assembly 50 is a pair of grooves substantially parallel to one another, in which third or adjacent support assembly 38 are a pair of grooves substantially parallel to one another. These pair of grooves of support assemblies 38 and 50 support a portion 34 of opposing side edges 14 of each of boxes 40,52 respectively and also substantially aligned longitudinally which in turn substantially aligns opposing edges 14 of third or another box 40 and fourth box 52 is substantial parallel relationship and aligns at least a portion of ends 16 of the same boxes. Member 32 is interposed and spaced apart from third or adjacent and fourth pair of grooves 38,50 which are adapted to support a portion 34 of third or another box 40 and fourth box 52 respectively. Another portion 36 of third and fourth boxes 40,52 extends beyond grooves 38,50 in a direction toward member 32. Member 32 is positioned to maintain ends 16 of third and fourth boxes 40,52 spaced apart and positioned to permit at least a portion of fourth box 52 and at least one of first and second boxes 26,30 to overlie one another, as seen in FIG. 5.

As previously discussed, it is desirable to maintain an axis which passes through fourth box 52 in generally horizontal position when secured in grooves 50. Once again it is desirable to have boxes 12 either in a horizontal position or at least in a tilted position in which end 16 of box 12 which is closer to member 32 is at a higher elevation than its opposing outer end 12.

Figure 6:
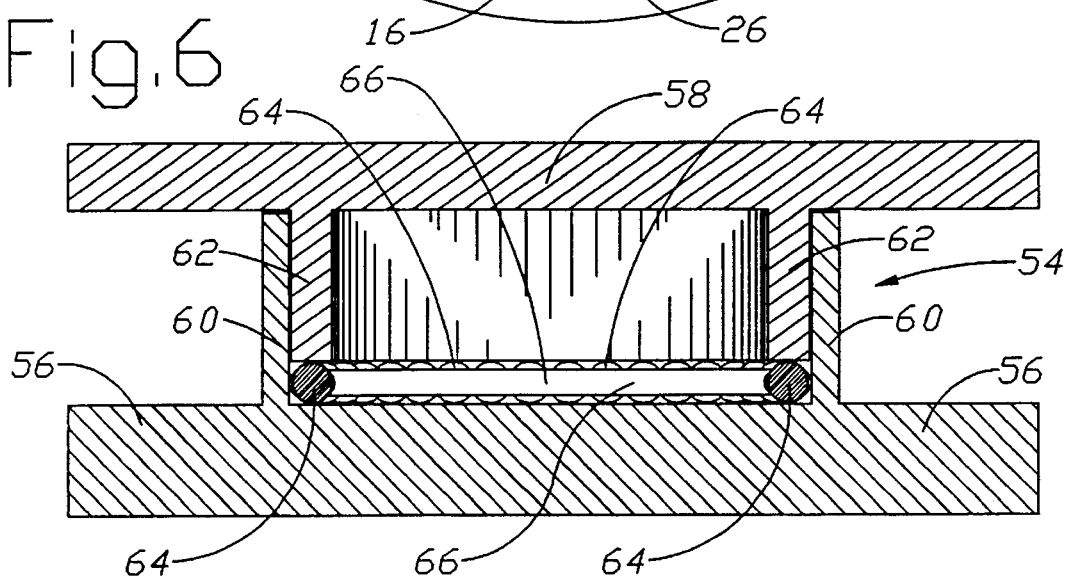
FIG. 6 is a cross section view as seen along line 6—6 of FIG. 3.

Shelving storage unit 10 has a means for rotating 54 frame member 22 relative to base 20, as seen in FIGS. 3 and 6. Many various constructions are contemplated to accomplish such rotation. Rotating means 54 allows a user to turn frame member 22 to access the desired recorded-media. Rotating means 54 has a platform base 56 which rests typically on a floor or other relatively flat surface. It is desirable for platform base 56 to be wider than frame member 22 to provide needed vertical stability to unit 10. Frame member 22 has a frame support 58 which supports frame member 22. Platform base 56 has a cylindrical collar 60 extending upwardly to receive another cylindrical collar 62 extending downwardly from frame support 58. Another cylindrical collar 62 is of slightly smaller dimension than cylindrical collar 62 in order for another cylindrical collar 62 to be able to rotate freely within cylindrical collar 60. Another cylindrical collar 62 extends downwardly into cylindrical collar 60 and rest upon a series of ball bearings 64 that are contained in a collar or ring 66. As a result, frame member 22 can be freely rotated to a desired position.

While a detailed description of the preferred embodiment of the invention has been given, it should be appreciated that many variations can be made thereto without departing from the scope of the invention set forth in the appended claims.

I claim:

1. A shelving storage unit for supporting at least one of recorded-media and boxes containing recorded-media having a width of greater dimension than the thickness of the opposing side edges and opposing ends having an axis extending through opposing side edges, comprising:

a base;

a frame member supported by and extending upwardly from said base in which a first support assembly is secured to said frame member adapted for supporting a first box and a second support assembly is secured to said frame member adapted for supporting a second box, in which said first and second support assemblies are positioned at substantially the same elevation above said base, for aligning opposing side edges of said first box in substantial parallel relationship to opposing side edges of said second box and for aligning at least a portion of an end of the first box with an end of the second box; and a member supported by said base and interposed and spaced apart from said first and second support assemblies in which said first and second support assemblies are adapted for supporting a portion of said first and second boxes and for permitting another portion of said first and second boxes to extend beyond said first and second support assemblies in a direction toward said member and in which said member is positioned for abutting said ends of said first and second boxes and for maintaining said ends of said first and second boxes in a spaced apart relationship.

2. The shelving storage unit of claim 1 in which said member is a pole secured to the base at one end of said pole and in which said pole extends upwardly from said base.

3. The shelving storage unit of claim 1 in which said frame member extends substantially vertically upward from said base.

4. The shelving storage unit of claim 1 in which said first and second support assemblies each include a first pair of spaced apart support members and a second pair of spaced apart support members respectively for supporting a portion of said opposing side edges of said first and second boxes in which said axes of said first and second boxes are maintained in generally a horizontal position.

5. The shelving storage unit of claim 4 in which said first pair of spaced apart support members are a pair of grooves disposed in said frame member, in which said second pair of spaced apart support members are a pair of grooves disposed in said frame member and in which said pair of grooves of said first pair of spaced apart support members are substantially aligned longitudinally to said grooves of said second pair of spaced apart support members.

6. The shelving storage unit of claim 5 in which said grooves of each of said first and second pair of support members are longer than they are wide.

7. The shelving storage unit of claim 5 in which the grooves within each pair of grooves of said first and second pair of grooves are substantially parallel to one another.

8. The shelving storage unit of claim 1 includes at least one of yet another support assembly secured to the frame member and adapted for supporting another box and spaced apart vertically above and along said frame member from said first support assembly, in which said first support assembly is substantially in vertical alignment with said yet another support assembly and in which said member is positioned spaced apart from said yet another support assembly in which said yet another support assembly is adapted for supporting a portion of said yet another box and for permitting another portion of said yet another box to extend beyond said yet another support assembly in a direction toward said member and in which said member is positioned for abutting an end of said yet another box.

9. The shelving storage unit of claim 8 in which said yet another support assembly is another pair of spaced apart support members.

10. The shelving storage unit of claim 9 in which said yet another pair of spaced apart support members are a pair of grooves.

11. The shelving storage unit of claim 10 in which said pair of grooves of said another pair of spaced apart support members are substantially parallel for supporting a portion of opposing side edges of said another box and for maintaining said axis of said another box in generally horizontal position.

12. The shelving storage unit of claim 11 in which said first support assembly is a pair of substantially parallel grooves in which the pair of grooves of said first support assembly are substantially parallel to the substantially parallel pair of grooves of said another pair of spaced apart support members.

13. The shelving storage unit of claim 8 includes at least one of a further support assembly secured to said frame member and adapted for supporting a further box and in which said further support assembly is spaced apart vertically along said frame member from said second support assembly in which said second support assembly is substantially in vertical alignment with said further support assembly.

14. The shelving storage unit of claim 13 in which said further support assembly includes a further pair of spaced apart support members.

15. The shelving storage assembly unit of claim 14 in which the further pair of spaced apart support members includes a pair of grooves substantially parallel to one another and adapted for supporting a portion of opposing side edges of said further box and maintaining said axis in generally a horizontal position, in which said another pair of spaced apart support members are a pair of grooves substantially parallel to one another and adapted for supporting a portion of the opposing side edges of said another box and in which said pair of grooves of said another pair of spaced apart support members are substantially aligned with said grooves of said further pair of spaced apart support members, in which said member is interposed and spaced apart from said pair of grooves of said another pair of spaced apart support members and said pair of grooves of said further pair of spaced apart support members and in which said member is positioned for maintaining ends of said another and further boxes spaced apart.

16. The shelving storage unit of claim 1 includes a third support assembly secured to said frame member vertically spaced from said first and second support assemblies and adapted to support a third box in which said third support assembly is positioned transverse to said first and second support assemblies to support said third box in transverse relationship to said first and second box, in which said third support assembly is spaced apart from said member in which said third support assembly is adapted to support a portion of said third box and permit another portion to extend beyond said third support assembly in a direction toward said member and in which said member is positioned to abut an end of said third box and permit at least a portion of said third box and a portion of at least one of said first and second boxes to overlie one another.

17. The shelving storage unit of claim 16 in which said third support assembly is a pair of spaced apart support members.

18. The shelving storage unit of claim 17 in which said pair of spaced apart support members are a pair of substantially parallel grooves adapted to support opposing side edges of the third box in which said axis is maintained in generally a horizontal position.

19. The shelving storage unit of claim of 16 in which said third support assembly is positioned substantially perpendicular to said first and second support assemblies.

20. The shelving storage unit of claim 16 includes a fourth support assembly secured to said frame member and adapted for supporting a fourth box in which said third and fourth support assembly are positioned at substantially the same elevation above said base.

21. The shelving storage unit of claim 20 in which the fourth support assembly includes a pair of spaced apart support members and in which the third support assembly includes a pair of spaced apart support members.

22. The shelving storage unit of claim 21 in which said fourth pair of spaced apart support members are a pair of grooves substantially parallel to one another, in which said third pair of spaced apart support members are a pair of grooves substantially parallel to one another, in which said pair of grooves of said third and fourth pair of spaced apart support members are adapted for supporting a portion of opposing side edges of the third and fourth box respectively in which said pair of grooves of said third pair of spaced apart support members are substantially longitudinally aligned with said grooves of said fourth pair of spaced apart support members substantially for aligning the opposing side edges of said third and fourth boxes in substantial parallel relationship and for aligning at least a portion of an end of the third box with an end of the fourth box, in which said member is spaced apart from said third and fourth pair of spaced apart support members in which said grooves are adapted for supporting a portion of said third and fourth boxes and for permitting another portion of said third and fourth boxes to extend beyond said grooves in a direction toward said member and positioned for maintaining the ends of said third and fourth boxes spaced apart and positioned for permitting at least a portion of the fourth box and at least one of said first and second boxes to overlie one another.

23. The shelving storage unit of claim 1 includes a means for rotating the frame member relative to said base.

24. A shelving storage unit for supporting at least one of recorded-media and boxes containing recorded-media having a width of greater dimension than the thickness of the opposing side edges and opposing ends having an axis extending through opposing side edges, comprising:

a base;

a frame member supported by and extending upwardly from said base and supported by said base in which a first support assembly is secured to said frame member and adapted for supporting a first box and an adjacent support assembly is secured to said frame member adjacent to said first support assembly and at a different elevation along said frame member above said base than said first support assembly, in which said adjacent support assembly is adapted for supporting another box in which said adjacent support assembly is positioned transverse to said first support assembly and for positioning said another box in transverse relationship to said first box; and a member supported by said base and interposed and spaced apart from said first and adjacent support assemblies in which first and adjacent support assemblies are adapted for supporting a portion of said first and another box and for permitting another portion of said first and another box to extend beyond said first and adjacent assemblies respectively in a direction toward said member and in which said member is positioned for providing an abutment for any said first and another box supported by said first and adjacent support assemblies in which said member is positioned for permitting at least a portion of said first box and said another box to overlie one another.

25. The shelving storage unit of claim 24 in which said first and adjacent support assemblies include a first and adjacent pair of spaced apart support members respectively.

26. The shelving storage unit of claim 25 in which the first and adjacent pairs of support members are each a pair of substantially parallel grooves disposed within said frame member adapted to support a portion of opposing edges of said first and another boxes respectively in which said axes of said first and second boxes are maintained in a generally horizontal position.

27. The shelving storage unit of claim 24 includes a second support assembly secured to said frame member and adapted for supporting a second box, in which said second support assembly is spaced apart from said first support assembly and is substantially aligned and positioned at substantially the same elevation above said base member as said first support assembly in which said member is interposed between and spaced from said first and second pair of grooves adapted for providing abutment for said first and second boxes supported by said first and second support assemblies and for maintaining ends of said first and second boxes spaced apart and in which said member is positioned for permitting at least a portion of said second box and said adjacent box to overlie one another.

28. The shelving storage unit of claim 27 in which said first and second support assembly includes a first and second pair of spaced apart support members respectively.

29. The shelving storage unit of claim 28 in which said first and second pair of spaced apart support members include each a pair of grooves in which the pair of grooves of each the first and second pair of spaced apart support members are adapted for supporting a portion of opposing edges of first and second boxes respectively and for maintaining said axes of said first and second boxes in generally horizontal position.

30. The shelving storage unit of claim 29 in which said first pair of grooves are substantially parallel to one another and said second pair of grooves are each substantially parallel to one another and in which said first pair and second pair of grooves are substantially longitudinally aligned to one another.

31. The shelving storage unit of claim 24 includes a fourth support assembly secured to said frame member and adapted for supporting a fourth box spaced apart from said adjacent support assembly and substantially aligned with one another and positioned at substantially the same elevation above said base, in which said member is interposed and spaced apart and between said fourth and adjacent pair of spaced apart support members in which said fourth and adjacent support assemblies are adapted for supporting a portion of said fourth and another boxes and for permitting another portion of said fourth and another boxes to extend beyond said fourth and adjacent support assemblies in a direction toward said member and in which said member is adapted for providing abutment for said fourth and another boxes supported by said fourth and adjacent support assemblies and for maintaining the ends of said fourth and another boxes spaced apart and in which said member is positioned for permitting at least a portion of said fourth and a portion of at least one of said first and second boxes to overlie one another.

32. The shelving storage unit of claim 31 in which said fourth support assembly and said adjacent support assembly include a fourth and adjacent pair of spaced apart support members respectively.

33. The shelving storage unit of claim 32 in which said fourth pair of spaced apart support members are a pair of substantially parallel grooves disposed within said frame member which are adapted for supporting a portion of opposing side edges of said fourth box and for maintaining said axis in generally horizontal position, in which said adjacent pair of spaced apart support members are a pair of substantially parallel grooves adapted for supporting a portion of opposing side edges of said another box and for maintaining said axis in generally a horizontal position and in which the pair of grooves of said fourth pair of spaced apart support members are substantially longitudinally aligned with the grooves of said adjacent pair of spaced apart support members.

34. The shelving storage unit of claim 24 includes a means for rotating the frame member relative to said base.

* * * * *